US006603390B1

(12) United States Patent
Tsumura et al.

(10) Patent No.: US 6,603,390 B1
(45) Date of Patent: *Aug. 5, 2003

(54) PAGER CAPABLE OF EN BLOC DISPLAY OF A SET OF MESSAGES

(75) Inventors: Toshiyuki Tsumura, Kanagawa (JP); Kazuhiko Fujimori, Kanagawa (JP); Yasushi Abe, Kanagawa (JP); Hideki Kuga, Kanagawa (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/859,850

(22) Filed: May 21, 1997

(30) Foreign Application Priority Data

Jun. 21, 1996 (JP) ........................................ P. 8-161398

(51) Int. Cl.[7] .................................................. H04Q 1/30

(52) U.S. Cl. ..................... 340/7.43; 340/7.38; 340/7.51

(58) Field of Search ....................... 340/825.27, 825.52, 340/825.69, 825.72, 825.04, 825.06, 825.31, 825.34, 825.44, 825.54, 825.47, 825.56, 825.21, 7.38, 7.43, 7.52, 7.55; 370/314; 705/1

(56) References Cited

U.S. PATENT DOCUMENTS 4,713,808 A * 12/1987 Gaskill et al. .............. 370/314
5,005,013 A * 4/1991 Tsukamoto et al. .... 340/825.44
5,293,484 A * 3/1994 Dabbs, III et al. .............. 705/1
5,363,377 A * 11/1994 Sharpe ....................... 370/314
5,426,422 A * 6/1995 Vanden Heuvel et al. ..................... 340/825.27
5,493,284 A * 2/1996 Kondo .................. 340/825.44
5,629,688 A * 5/1997 Muramatsu et al. ... 340/825.44
5,774,057 A * 6/1998 Kalbermatter ......... 340/825.21
5,959,544 A * 9/1999 Matsuura ............... 340/825.44

* cited by examiner

*Primary Examiner*—Michael Horabik
*Assistant Examiner*—William Bangachon
(74) *Attorney, Agent, or Firm*—Pearne & Gordon LLP

(57) ABSTRACT

If a received signal includes a message signal following the address of the pager concerned, a decoder section decodes the message signal and a control section stores it in a memory section together with a reception time. At this time, the control section judges whether the message signal includes a sender identification code or a consecutive transmission code. If either code exists, the control section stores it in the memory section together with the message. The control section reads message data from the memory section, and a display control section controls a display section to display the message. If the message includes a sender identification code or a continuous transmission code, the control section searches for messages to be displayed together with the current message from among the other messages stored in the memory section, and the display control section controls the display section to display the found messages en bloc.

4 Claims, 9 Drawing Sheets

| | 1 | 2 | 3 | 4 | 5 | 6 | 7 | 8 | 9 | 0 |
|---|---|---|---|---|---|---|---|---|---|---|
| 1 | ア | イ | ウ | エ | オ | A | B | C | D | E |
| 2 | カ | キ | ク | ケ | コ | F | G | H | I | J |
| 3 | サ | シ | ス | セ | ソ | K | L | M | N | O |
| 4 | タ | チ | ツ | テ | ト | P | Q | R | S | T |
| 5 | ナ | ニ | ヌ | ネ | ノ | U | V | W | X | Y |
| 6 | ハ | ヒ | フ | ヘ | ホ | Z | ? | ! | — | / |
| 7 | マ | ミ | ム | メ | モ | ¥ | & | | | |
| 8 | ヤ | ( | ユ | ) | ヨ | * | # | | | |
| 9 | ラ | リ | ル | レ | ロ | 1 | 2 | 3 | 4 | 5 |
| 0 | ワ | ヲ | ン | ゛ | ゜ | 6 | 7 | 8 | 9 | 0 |

K: SENDER IDENTIFICATION CODE PRESENCE/ABSENCE FLAG

*FIG. 9*

| DISPLAY EXAMPLE WITHOUT EN BLOC DISPLAY CANCELLATION | DISPLAY EXAMPLE WITH EN BLOC DISPLAY CANCELLATION OF TIME CONTROL |
|---|---|
| PAGE-1 OF MASSAGE SET-1 disp3-1<br>コノメッセーシ"ヲミタラ<br>TELクタ"サイ012−<br>345−4567サキホト<br>"ノケンTELアリカ"ト | PAGE-1 OF MASSAGE SET-1 disp3-3<br>コノメッセーシ"ヲミタラ<br>TELクタ"サイ012−<br>345−4567 |
| PAGE-2 OF MASSAGE SET-1 disp3-2<br>ウコ"サ"イマシタ | PAGE-2 OF MASSAGE SET-2 disp3-4<br>サキホト"ノケンTELア<br>リカ"トウコ"サ"イマシタ |

*FIG. 10*

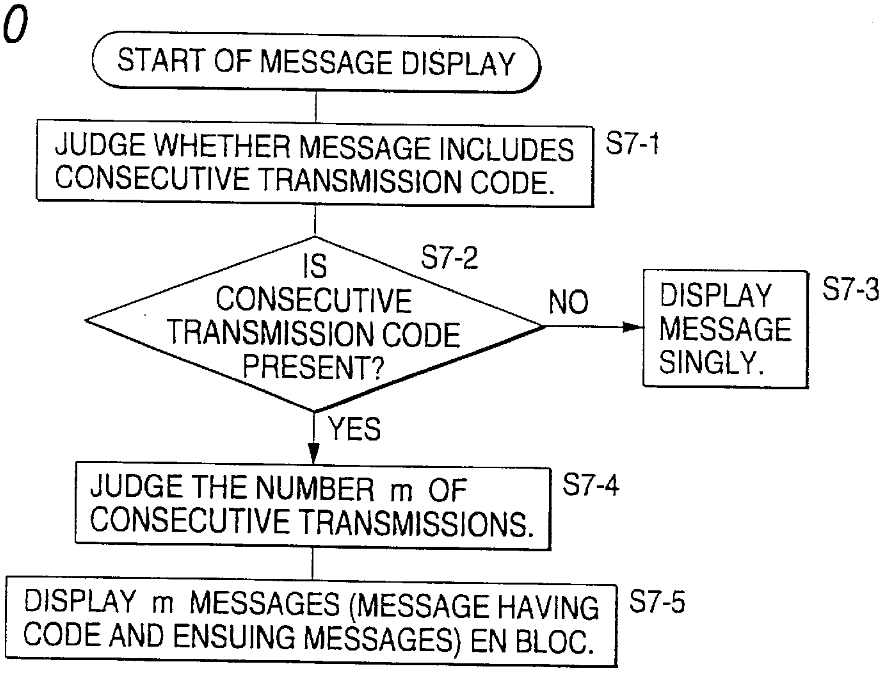

PAGER CAPABLE OF EN BLOC DISPLAY OF A SET OF MESSAGES

BACKGROUND OF THE INVENTION

1. Field of the Invention

The present invention relates to a pager (radio calling receiver) having a means for storing a plurality of messages as well as a function of displaying a plurality of characters.

2. Description of the Related Art

FIG. 13 is a block diagram showing a conventional, commonly known pager with a display. In FIG. 13, reference numeral 15 denotes an antenna; 16, a radio section; 17, a waveform shaping section; 18, a decoder section; 19, a control section; 20, a notification control circuit; 21, an EEPROM; 22, a memory section; 23, a display control section; 24, a display section; 25, a read switch; 26, a motor; 27, a LED; and 28, a singing section.

A high-frequency signal received by the antenna 15 and the radio section 16 is demodulated into a digital signal by the waveform shaping section 17. The digital signal is decoded by the decoder section 18. The control section 19 compares a received calling address with a selective calling address of the pager concerned which is written in the EEPROM 21. If they coincide with each other, the control section 19 operates the notification control circuit 20 to drive the LED 27 together with the singing section 28 or the motor 26, to thereby notify the user of reception of a signal that is directed to the address of the pager concerned.

If a message signal follows the received address (i.e., the address of the pager concerned), the decoder section 18 decodes the message signal and the control section 19 stores it in the memory section 22 together with a reception time. The control section 19 reads message data from the memory section 22, and the display control section 23 controls the display section. 24 to display the message. A stored message can be read out again from the memory section 22 by depressing the read switch 25. A plurality of stored messages can be sequentially read out by depressing the read switch 25 a necessary number of times.

However, when receiving message information, the above conventional pager with a display separately displays individual messages. Further, in displaying stored messages, the conventional pager separately displays those on different pages in order of their reception times.

In a paging service, the number of characters (and symbols) of a message that can be transmitted at one time is limited due to limitations from a signal scheme or for the purpose of reducing the degree of congestion of telephone lines. Therefore, when the number of characters of a message to be transmitted exceeds the character number limitation, the sender is required to transmit its divided parts in the form of plural times of transmissions.

In particular, in recent years, the free-word transmission is the mainstream in which kana-characters and alphanumeric characters are transmitted with two message numeric characters used as a unit. For example, even in a service which allows 24 message numeric characters to be transmitted at a time, only 11 kana-characters can be transmitted at a time because of the use of a free-word conversion code.

Therefore, even when the same sender wants to send a set of messages, the conventional method only allows those messages to be received and displayed separately.

In this case, to read a set of messages, the owner of a pager is required to depress the read switch plural times. Further, it is difficult for him to recognize the message content because of page switching. The message recognition becomes more difficult when a message from another sender is inserted between a plurality of messages from a single sender.

SUMMARY OF THE INVENTION

The present invention has been made in view of the above problems in the art, and has as an object providing a pager which allows a user to easily recognize a message content by displaying a set of messages from the same sender en bloc on the same page.

To attain the above object, in a pager according to the invention, a sender adds a sender identification code or a consecutive transmission code as part of message information. When receiving a message, the pager finds related messages from the same sender by recognizing the code and causes those messages to be displayed en bloc on the same screen sequentially in order of their receptions. Thus, a user is allowed to recognize the message content more easily.

More specifically, according to a first aspect of the invention, there is provided a pager comprising a memory section for storing a received message; a display section; means for receiving a message including a sender identification code and for recognizing the sender identification code; and means for causing the display section to display, en bloc, messages having the same sender identification code based on recognition results of the recognizing means. With this configuration, related messages that have been sent in the form of a plurality of transmissions can be displayed on the same page, whereby a user of the pager can recognize a message content more easily.

The pager may further comprise means for managing the memory section by using the sender identification code as a parameter when the message having the sender identification code is received and stored in the memory section; and means for retrieving messages from the memory section such that they are discriminated for respective sender identification codes, when they are displayed on the display section. With this configuration, in the pager, the message retrieval and the display control designing can be performed more easily.

The pager may further comprise means for recognizing an en bloc display cancellation code included in a message; and means for causing the messages having the same sender identification code to be displayed on the display section such that divided parts of the messages having the same sender identification code are displayed separately, by using the en bloc display cancellation code. With this configuration, when the same sender transmits a set of messages such that an en bloc display cancellation code is included in one of the messages, messages up to the message including the cancellation code are displayed en bloc. If the sender thereafter sends another set of messages including, after the cancellation code, a message having an en bloc display code (i.e., a sender identification code), that message can be displayed as the head of the new set of messages.

The pager may further comprise means for measuring a difference between reception times of received messages; and means for causing the messages having the same sender identification code to be displayed on the display section en bloc excluding a message that is received after a lapse of a predetermined time from a preceding message and messages ensuing that message. With this configuration, when the same sender makes transmissions (i.e., transmissions of a separate set of messages) after a lapse of the predetermined time from the preceding transmission even without considering cancellation of en bloc display, such transmissions can automatically be judged as transmissions of a set of messages different from the preceding set of messages.

According to another aspect of the invention, there is provided a pager comprising a memory section for storing a received message; a display section; means for receiving a message having a consecutive transmission code indicating the number of consecutively transmitted messages and for recognizing the consecutive transmission code; and means for combining consecutive messages indicated by the consecutive transmission code and for causing the combined consecutive messages to be displayed en bloc on one page of the display section. With this configuration, when a sender intends to transmit a set of messages, he inserts, at the head of the first message, a consecutive transmission code indicating the number of messages to be displayed en bloc. Since the pager judges the number of messages to be displayed en bloc, it is not necessary to insert a consecutive transmission code into the second message onward, whereby the limited number of characters that can be transmitted as a single message can be used efficiently.

According to a further aspect of the invention, there is provided a pager comprising a memory section for storing a received message; a display section; means for measuring a difference between reception times of received messages; and means for causing messages that are received within a predetermined period to be displayed en bloc on one page of the display section. With this configuration, when a sender simply transmits consecutively within a predetermined period messages to be displayed en bloc even without considering en bloc display, the pager judges that those messages are sent from the same sender and displays those messages en bloc. Thus, a user of the pager can recognize messages more easily.

The pager according to any of the above aspects of the invention may further comprise means for allowing switching between en bloc display and individual display by a user's manipulation of a switch. With this configuration, when a user of the pager can judge whether successively received messages are related to each other, he can effect an en bloc display operation so that the messages are displayed on the same page. Thus, the user can recognize a set of messages more easily.

BRIEF DESCRIPTION OF THE DRAWINGS

FIG. 9 compares display examples of cases where the time-controlled en bloc display cancellation of the fourth embodiment is used and not used, respectively;

FIG. 10 is a flowchart showing a message display operation using a consecutive transmission code according to a fifth embodiment of the invention;

DESCRIPTION OF THE PREFERRED EMBODIMENTS

Embodiments of the present invention will be hereinafter described in detail with reference to the accompanying drawings.

Embodiment 1

Figures 1, 2:
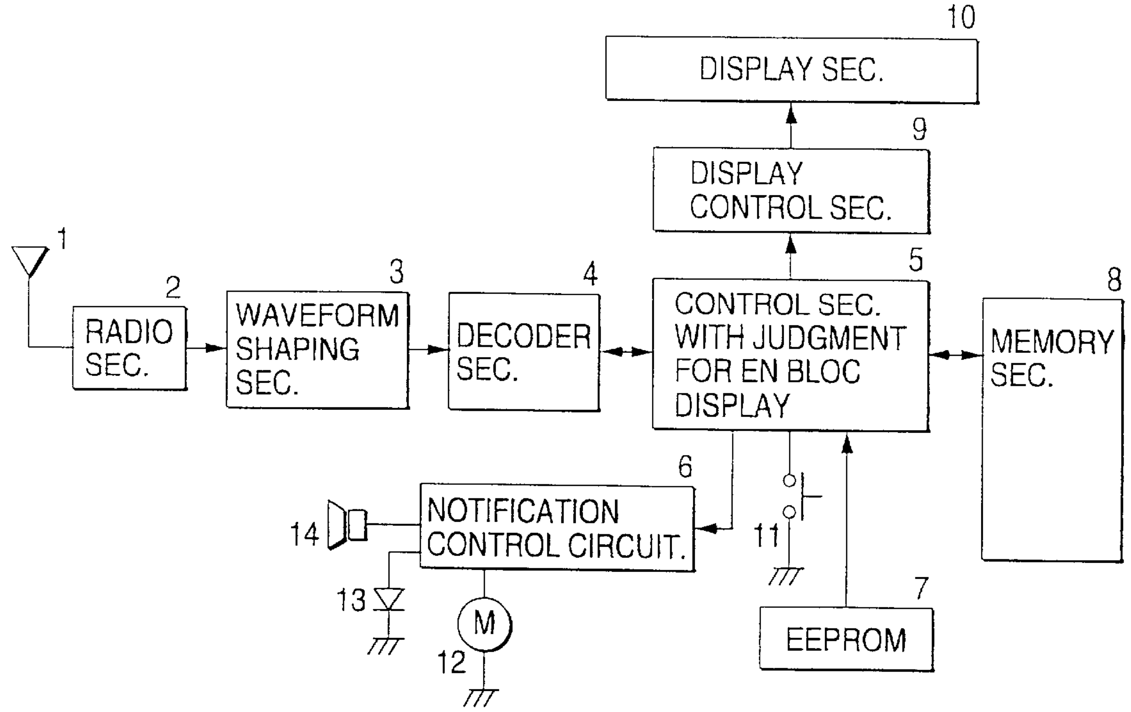
FIG. 1 is a block diagram showing the configuration of a pager according to a first embodiment of the present invention.
FIG. 2 shows a kana-numeral conversion matrix used in the first embodiment.

FIG. 1 is a block diagram showing the configuration of a pager according to a first embodiment of the invention. In FIG. 1, reference numeral 1 denotes an antenna; 2, a radio section; 3, a waveform shaping section; 4, a decoder section; 5, a control section; 6, a notification control circuit; 7, an EEPROM; 8, a memory section; 9, a display control section; 10, a display section; 11, a read switch; 12, a motor; 13, a LED; and 14, a singing section.

A high-frequency signal received by the antenna 1 and the radio section 2 is demodulated into a digital signal by the waveform shaping section 3. The digital signal is decoded by the decoder section 4. The control section 5 compares a received calling address with a selective calling address of the pager concerned which is written in the EEPROM 7. If they coincide with each other, the control section 5 operates the notification control circuit 6 to drive the LED 13 together with the singing section 14 or the motor 12, to thereby notify the user of reception of a signal that is directed to the address of the pager concerned.

If a message signal follows the received address (i.e., the address of the pager concerned), the decoder section 4 decodes the message signal and the control section 5 stores it in the memory section 8 together with a reception time. At this time, the control section 5 judges whether the message signal includes a sender identification code or a consecutive transmission code. If either code exists, the control section 5 stores it in the memory section 8 together with the message. The control section 5 reads message data from the memory section 8, and the display control section 9 controls the display section 10 to display the message. If the message includes a sender identification code or a consecutive transmission code, the control section 5 searches for messages to be displayed together with the current message from among the other messages stored in the memory section 8, and the display control section 9 controls the display section to display the messages en bloc.

A stored message can be read out again from the memory section 8 by depressing the read switch 11. Also in this case, the control section 5 judges of the existence of messages to be displayed en bloc from among the messages stored in the memory section 8, and the display control section 9 controls the display section 10 to display those messages.

Next, a display example will be described with reference to FIGS. 2 and 3. The first embodiment is directed to a paging service having a limitation that a message of a single transmission should consist of 24 characters in terms of 4-bit codes at the maximum. It is assumed that a sender identification code is located at the head of a message, and that it consists of "]" (4-bit code) and ensuing two numeric characters. It is also assumed that kana-characters are transmitted according to a common method in which two "-"'s (4-bit code) are followed by pairs of numeric characters, each pair representing one kana-character.

The following example is directed to a case where a sender transmits a message "コノメッセーシヲミタラTEL クタ゛サイ012-345-6789" (If you see this message, please call me at 012-345-6789). Because of the limitation that the maximum number of numeric characters of a message transmittable by a single transmission is 24, the above message is transmitted as four divisional parts in the following manner.

The following transmission sequence is obtained by assigning two numeric characters to each kana-character according to the conversion matrix of FIG. 2:

1st transmission: ]01--255574433469330402

2nd transmission: ]01--724191401037

コノメッセーシヲ

3rd transmission: ]01--2341643112

ミタラTEL

4th transmission: ]01--0123456789

クタ゛サイ

According to the conventional technique, the same message is usually transmitted in the following manner:

1st transmission: --255574433469330402

コノメッセーシヲ

2nd transmission: --724191401037

ミタラTEL

3rd transmission: --2341043112

クタ゛サイ

4th transmission: 01 012-345-6789

Figure 3:
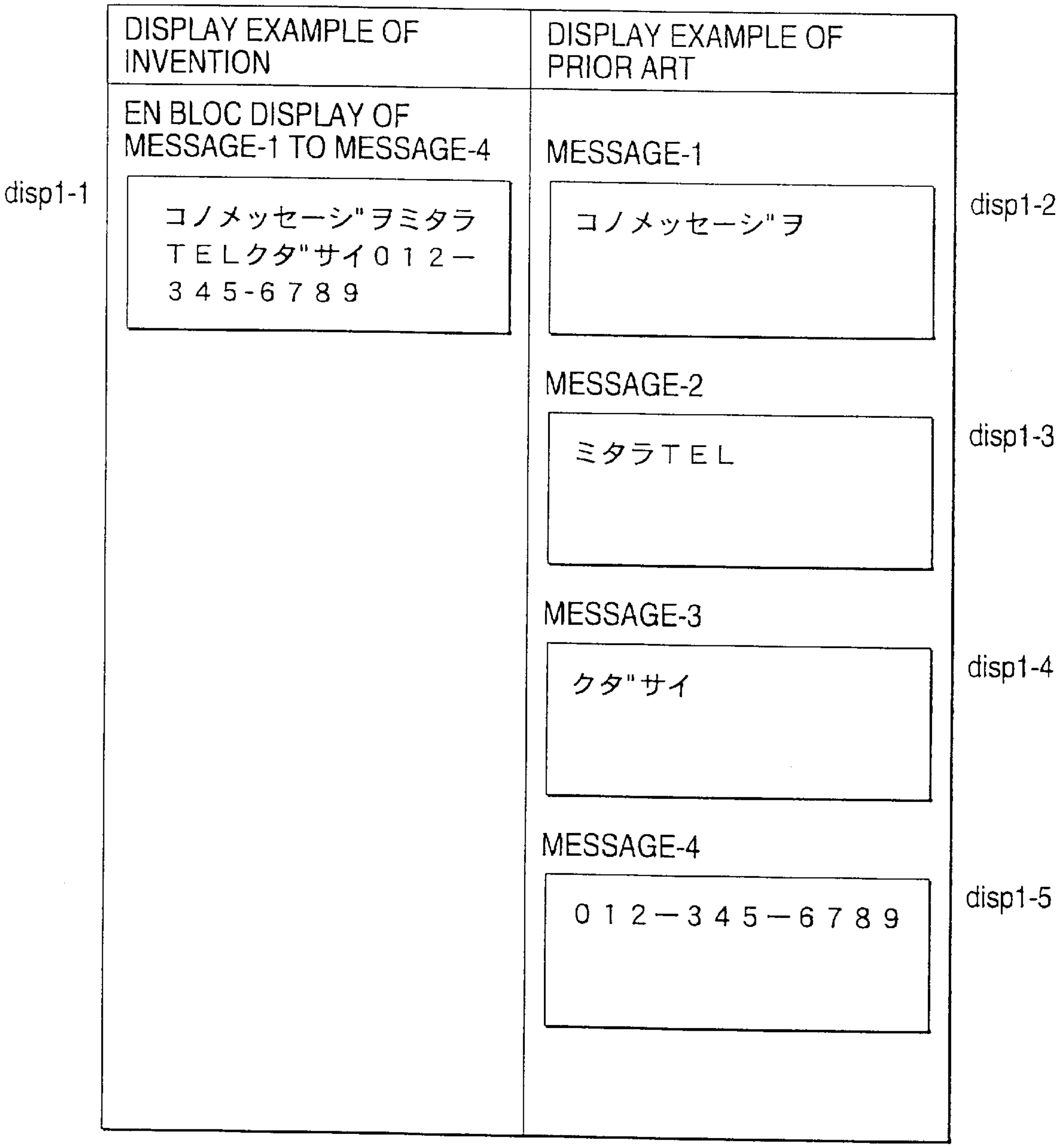
FIG. 3 compares display examples of the first embodiment and a conventional technique.

FIG. 3 compares display examples-of this embodiment and the conventional technique which are displayed when the above four message transmissions are received. The display example of the invention is denoted by disp1-1 while the display example of the conventional technique is denoted by disp1-2 to disp1-5. As seen from FIG. 3, the content of the displayed message of this embodiment can be recognized more easily than that of the conventional technique.

In the invention, since a sender can be identified by a code, the free word conversion code can be omitted in transmissions in the following manner. In this case, the pager integrally controls and displays related messages from the same sender including free word conversion codes included therein.

1st transmission: ]01--255574433469330402

コノメッセーシヲ

2nd transmission: ]01 724191401037

ミタラTEL

3rd transmission: ]01 2341043112_

クタ゛サイ

4th transmission: ]01 012-345-6789

The symbol "_" in the third transmission is a free word cancellation code.

In this case, while the same en-bloc display as the display example disp1-1 shown in FIG. 3 is obtained, the number of transmitted characters can be reduced.

In this embodiment, the sender identification code is located at the head of a message and consists of "]" and ensuing two numeric characters. However, the number of symbols and characters of the sender identification code and its insertion position into a message are not limited to those in this embodiment and can be set arbitrarily in the pager. For example, a sender name in katakana-characters after a free word conversion code, a telephone number of an individual sender, and a telephone directory number registered in the pager can also be used as the sender identification code. The arbitrariness of the code form allows the sender identification code to be easily combined with conventional functions.

Embodiment 2

Figure 4:
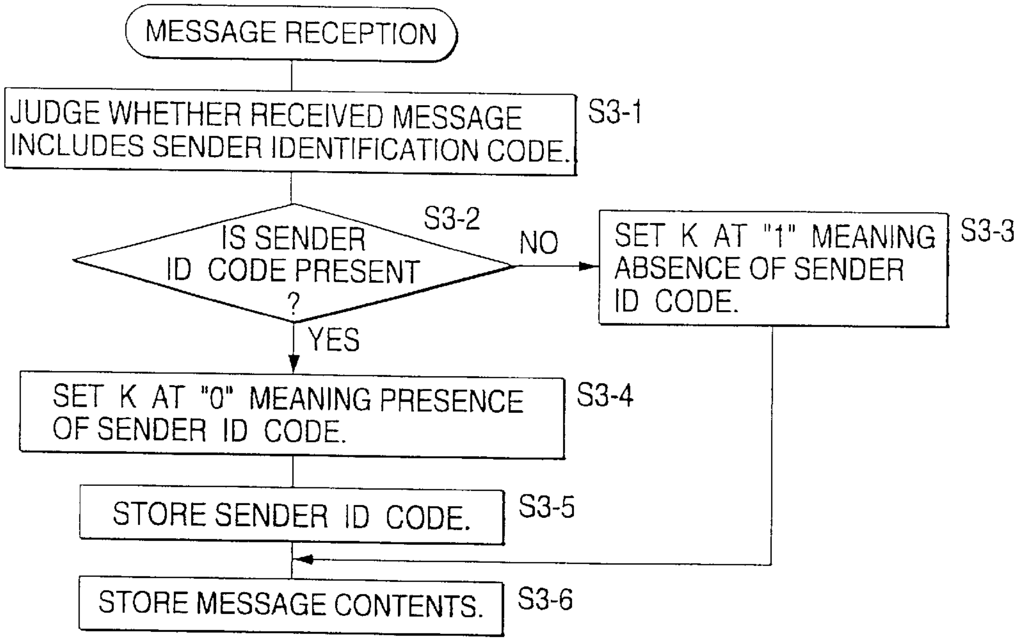
FIG. 4 is a flowchart showing a received message storing operation according to a second embodiment of the invention.
Figure 5:
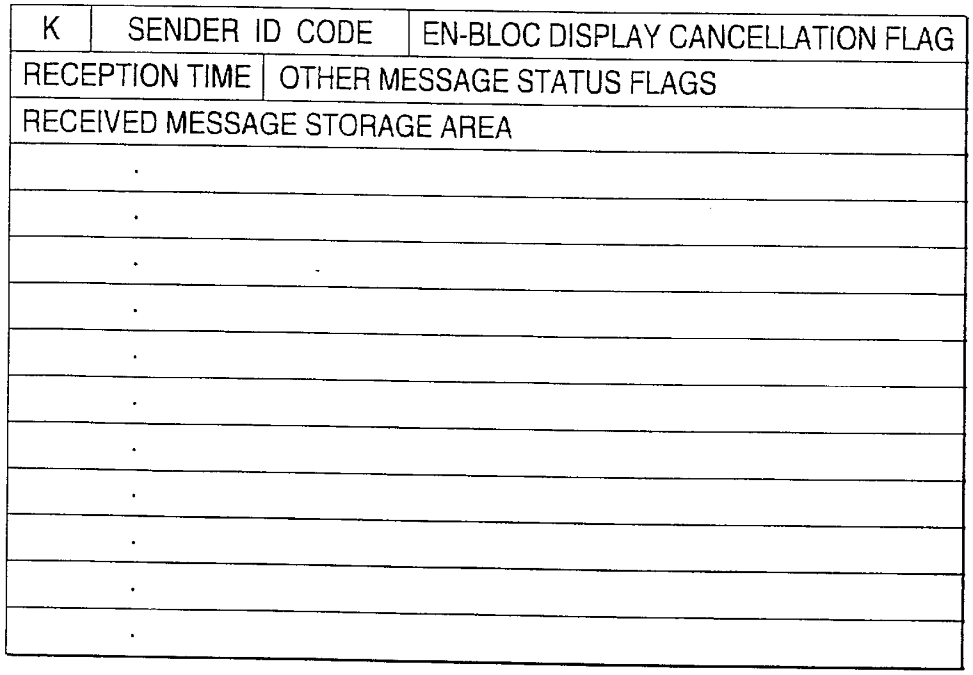
FIG. 5 shows the structure of a message storing memory according to the second and third embodiments of the invention.

Referring to FIGS. 4 and 5, a description will be made of a method for discriminating a sender identification code included in a message as received. FIG. 4 is a flowchart showing a process of storing contents of a message upon its reception. FIG. 5 shows an example of the structure of a received message storing memory (i.e., memory sec. 8).

Referring to FIG. 4, upon reception of a message, a search is made to check whether there exists a code having the predetermined sender identification code format (in this embodiment, symbol "]" at the head of the message and ensuing two numeric characters) at step S3-1. If no sender identification code is found at step S3-2, the received message is judged to be a single message that is irrelevant to other messages and, at step S3-3, a flag K is set at "1" meaning absence of a sender identification code.

If a sender Identification code exists at step S3-2, it is judged that the received message relates to other messages and hence is a subject of en-bloc display. In this case, K is set at "0" at step S3-4 and, at the same time, the sender identification code is stored in the message storing memory at steps S3-5 and S3-6. By storing the flag K indicating presence/absence of a sender identification code in the memory, the processing time of message display can be reduced.

Embodiment 3

Figure 6:
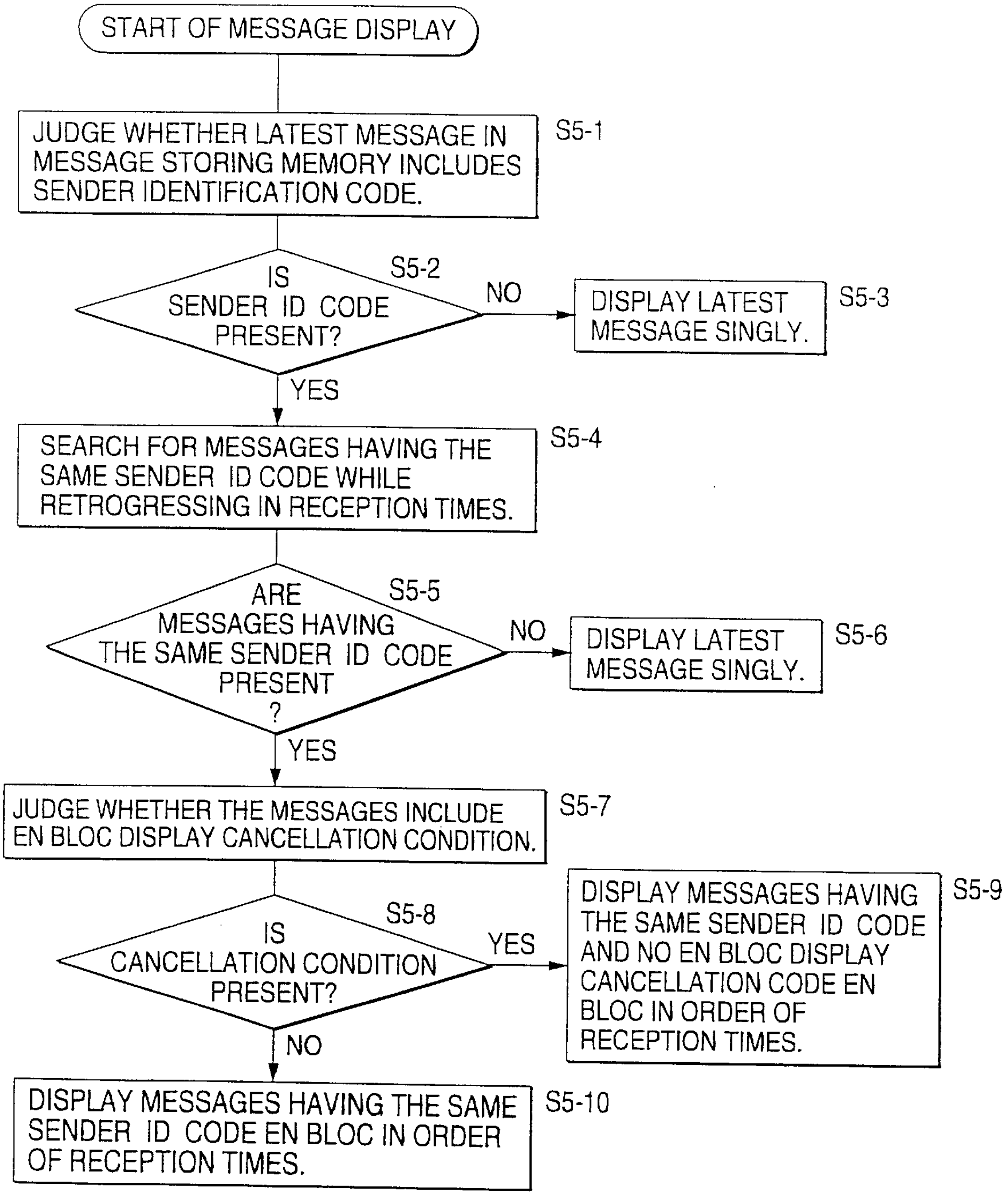
FIG. 6 is a flowchart showing a message display operation using an en bloc display cancellation code according to the third embodiment of the invention.

Referring to FIGS. 1, 5, and 6, a description will be made of a process of displaying messages. To display a message upon its reception or by depressing the read switch 11, at S5-1 and S5-2 the control section 5 judges, on a message having the latest reception time among the messages stored in the memory section 8, whether the value of the flag K (see FIG. 5) is 1or 0. If no sender identification code exists (K=1), the display control section 9 causes the display section 10 to singly display the message concerned, with a judgment that it is irrelevant to other messages. If there exists a sender identification code (K=0), at steps S5-4 and S5-5 a search is made to check whether there exists a message having the same sender identification code as the message concerned in messages having earlier reception times than the message concerned. If there is no such message, the message concerned is displayed singly at step S5-6 with a judgment that it is irrelevant to other messages. If there exist messages having the same sender identification code as the message concerned, it is judged at steps S5-7 and S5-8 whether those messages include an en bloc display cancellation condition. If no such condition exists, at step S5-10 the display control section 9 causes the display section 10 to display all the messages having the same sender identification code as the message concerned. If there exists an en bloc display cancellation condition, messages up to the message including the condition are displayed en bloc at step S5-9.

Next, an en bloc display cancellation code will be described. When the same sender transmits a set of messages, en bloc display is performed as described above by using the sender identification code. The en bloc display cancellation code is used to prevent an event that all the set of transmitted messages are displayed.

In the following example, an en bloc display cancellation code "]]"(two 4-bit codes) is used and a set of messages サキホト゛ノケンTELアリカ゛トウコ゛サ゛イマシタ" (Thank you for your call a while ago.) follows the set of messages of the previous example.

1st transmission: ]01--2555744334693304020

コノメッセーシヲ

2nd transmission: ]01--724191401037

ミタラTEL

3rd transmission: ]01--2341043112

クタ゛サイ

4th transmission: ]01012-345-6789]]

5th transmission: ]01 3122654504552403

サキホト゛ノケン

6th transmission: ]01 401037119221044513

TELアリカ゛トウ

7th transmission: ]01 25043104127132 41]]

コ゛サ゛イマシタ

Figure 7:
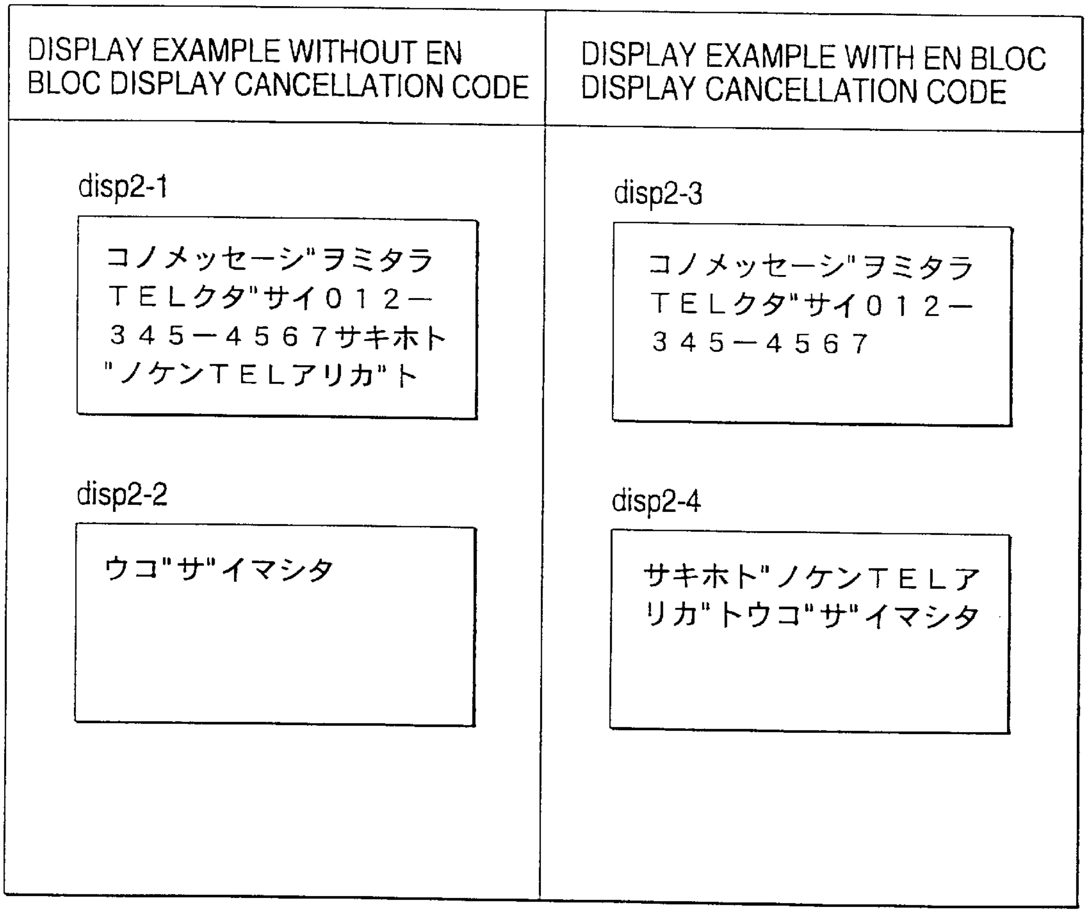
FIG. 7 compares display examples of cases where the en bloc display cancellation code of the third embodiment is used and not used, respectively.

FIG. 7 shows display examples of cases where the en bloc display cancellation code is used (disp2-1 and disp2-2) and not used (disp2-3 and disp2-4). As seen from FIG. 7, even messages from the same sender can be displayed on separate pages, enabling a sentence to be recognized more easily.

Embodiment 4

Figure 8:
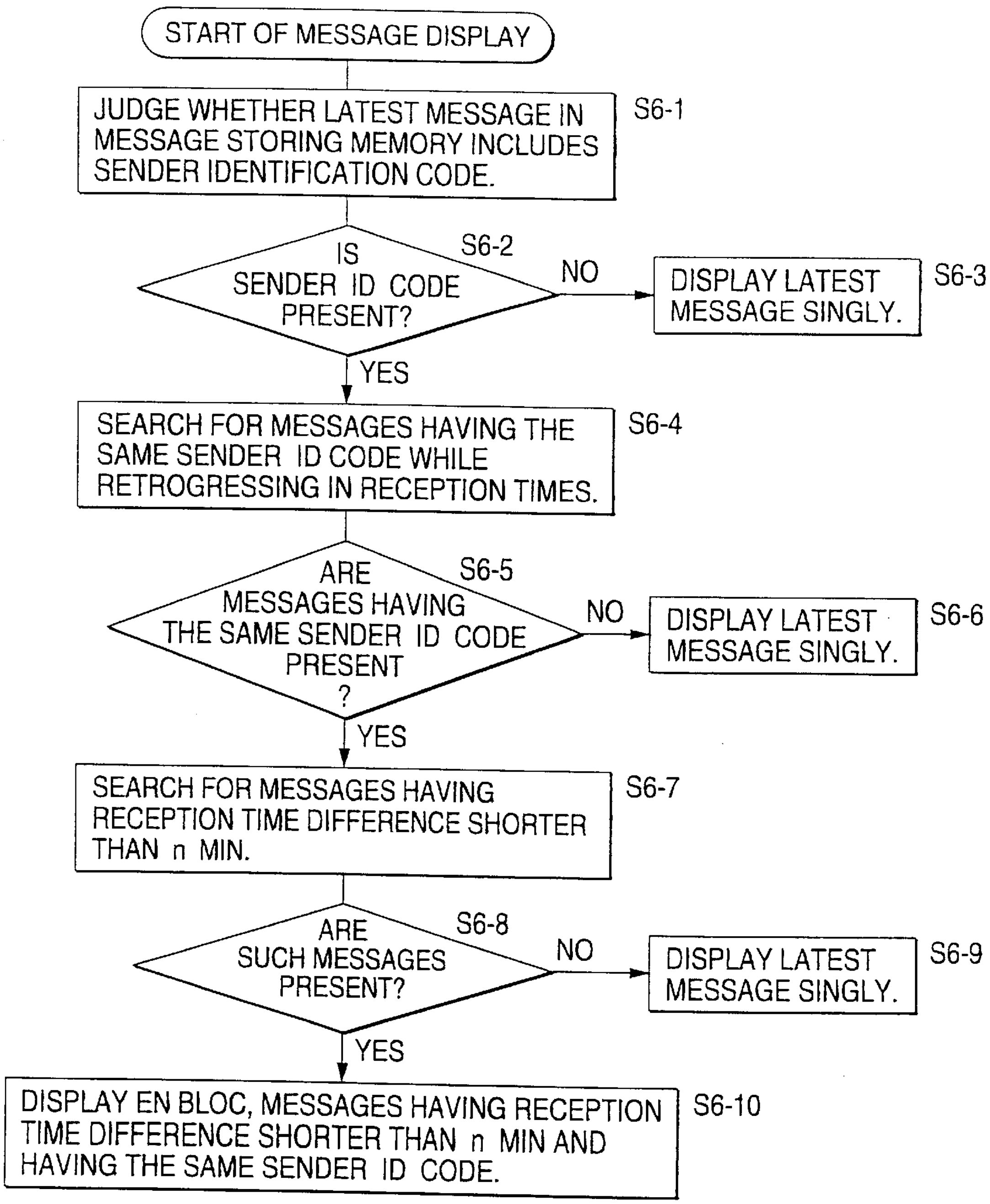
FIG. 8 is a flowchart showing a message display operation with time,control according to a fourth embodiment of the invention.

Referring to a flowchart of FIG. 8, a description will be made of a case where en bloc display cancellation is effected by time control. At steps S6-1 to S6-6, judgments relating to a sender identification code are performed in the same manner as in the third embodiment. If there exist messages having the same sender identification code as the message concerned, at step S6-7 a difference in reception time is calculated between each pair of adjacent messages having the same sender identification code and it is judged whether the difference is shorter than a predetermined time (say, n minutes). Only the messages whose differences in reception time are shorter than n minutes are made a subject of en bloc display. The display control section 9 causes the display section 10 to display those messages en bloc. As compared to the third embodiment using the en bloc display cancellation code, this embodiment is advantageous in that the sender is not required to input an en bloc display cancellation code.

The following is a transmission example in which en bloc display is canceled by time control.

1st transmission: ]01--255574433469330402

コノメッセーシヲ

2nd transmission: ]01--724191401037

ミタラTEL

3rd transmission: ]01--2341043112

クタ゛サイ

4th transmission: ]0112-345-6789

5th transmission: ]01 3122654504552403

サキホト゛ノケン

6th transmission: ]01 401037119221044513

TELアリカ゛トウ

7th transmission: ]01 25043104127132 41]]コ゛サ゛イマシタ

It is assumed that the first to fourth transmissions are performed such that adjacent transmissions are effected within n minutes, the fifth transmission is performed after a lapse of more than n minutes from the fourth transmission, and the fifth to seventh transmissions are performed such that adjacent transmissions are effected within n minutes. FIG. 9 shows a resulting display example in comparison with a display example without en bloc display cancellation.

Fifth Embodiment

FIG. 10 is a flowchart showing a process for performing en bloc display of messages using a consecutive transmission code. To display messages, first it is checked at step S7-1 whether a received message includes a consecutive transmission code. If a consecutive transmission code exists at step S7-2, the number m of consecutive transmissions is judged at step S7-4. At step S7-5, m messages, i.e., the message including the consecutive transmission code and ensuing messages having later reception times are displayed en bloc. A message not including a consecutive transmission code and a message that is not a subject of en bloc display are displayed as a single message at step S7-3.

An example of en bloc display will be described below in which four successive messages are displayed en bloc by using a consecutive transmission code. In this example, the consecutive transmission code is a sequence of "[," "the number of consecutive transmissions," and "]." Further, in the related messages, control of a free word conversion code, for instance, is made effective between divided messages.

1st transmission: [4]--255574433469330402 z,1

2nd transmission: 724191401037

ミタラTEL

3rd transmission: 2341043112

クタ゛サイ

4th transmission: 012-345-6789

サキホト゛ノケン

The code "[4" at the head of the first transmission indicates that the sender intends to transmit four messages that are to be displayed en bloc. The same display result as shown in FIG. 3 is obtained. Although in this example the consecutive transmission code is a sequence of "[," "one numeric character," and "]" inserted at the head of the first message, the number of characters and the insertion position of the consecutive transmission code are not limited to those in this example and can be set arbitrarily in the pager.

Embodiment 6

Figure 11:
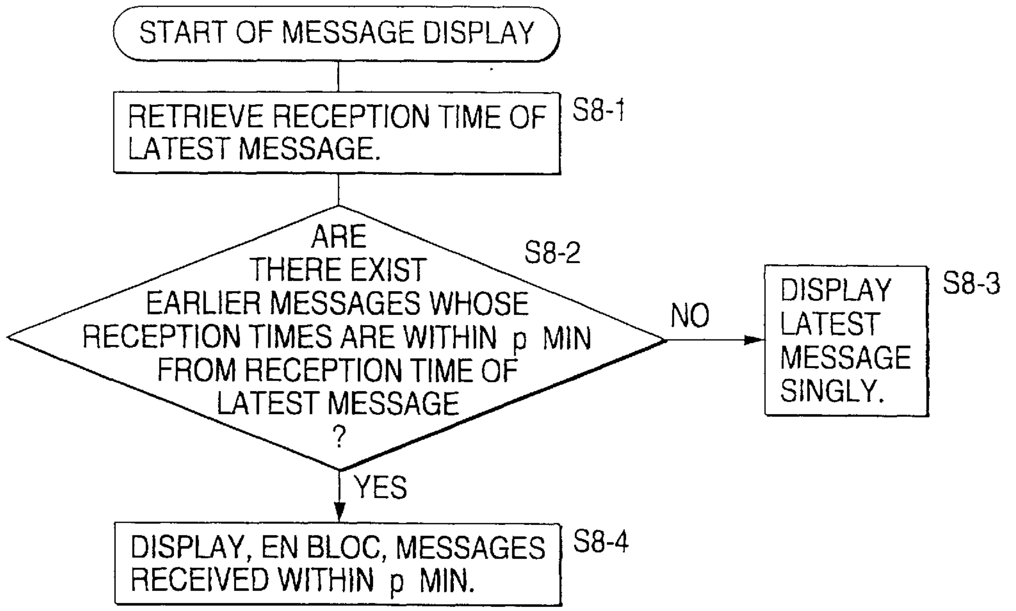
FIG. 11 is a flowchart showing a message display operation with reception-time-based control according to a sixth embodiment of the invention.

FIG. 11 shows a process for performing en bloc display of related messages by using only counts of reception times, i.e., without using any codes such as the sender identification code and the consecutive transmission code. To display messages, first the reception time of the latest message is retrieved at step S8-1. At step S8-2, a search is made for messages, among earlier messages, whose reception times are within p minutes (preset for en bloc display control) from the reception time of the latest message. If there exist no such messages, the latest message is displayed singly at step S8-3. If there exist such messages, en bloc display is effected at step S8-4.

Transmissions are performed as follows:

1st transmission: --255574433469330402

コノメッセーシヲ

2nd transmission: --724191401037

ミタラTEL

3rd transmission: --2341043112

クタ゛サイ

4th transmission: 012-345-6789

The second to fourth transmissions are performed within p minutes from the first transmission. In this manner, the same display result as shown in FIG. 3 can be obtained without the need for the sender's inputting a special code, thus facilitating manipulations for message transmission.

Embodiment 7

Figure 12:
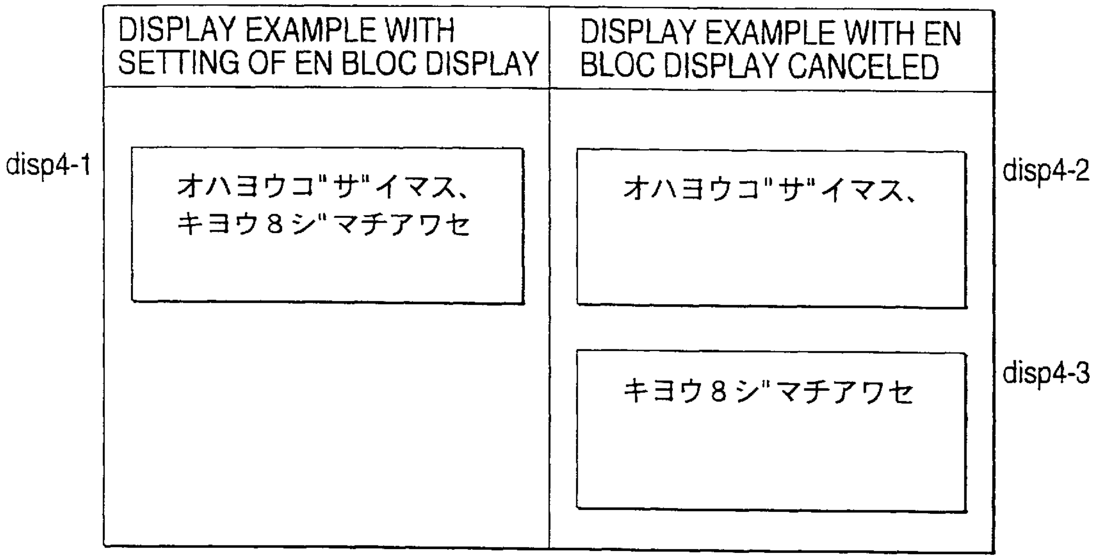
FIG. 12 shows display examples of a case where en bloc display is set or canceled by a switch manipulation according a seventh embodiment of the invention.

This embodiment is directed to a case where en bloc display is set and canceled only by a switch manipulation. FIG. 12 shows display examples of a case where messages "オハヨウコ゛ザ゛イマス" (Good morning.) and "キョウ8シ゛マチアワセ" (Today let's meet at 8 o'clock.) are transmitted in a divided manner. A display example with setting of en bloc display is denoted by disp4-1 and a display example with en bloc display canceled is denoted by disp 4-2 and disp4-3. The pager is so constructed as to allow the en bloc display to be set or canceled by a switch manipulation.

If a display switching manipulation is performed while the message page disp4-1 is displayed, it is divided into the pages disp4-2 and disp4-3. Conversely, it a display switching manipulation is performed while the message pages disp4-2 and disp4-3 are displayed, the en bloc display page disp4-1 is obtained. This embodiment is advantageous in that the display method can be switched in accordance-with the preference of a user of the pager.

As described above, the invention allows a user to recognize messages more easily by causing a set of related messages from the same sender to be displayed en bloc by including, in a message signal, a code for identifying a sender such as a sender identification code or a consecutive transmission code, measuring the reception time, or enabling a switch operation. Since the number of symbols and characters of the sender identification code or the consecutive transmission code and its insertion position in a message can be set arbitrarily, conventional function codes, a sender name, and the like can be regarded as codes. Therefore, the sender identification code and the consecutive transmission code can be combined with conventional functions, thereby increasing the degree of freedom in designing.

What is claimed is:

1. A radio calling receiver comprising:

means for receiving messages having sender identification codes;

a memory section for storing received messages;

a display section;

means for recognizing the sender identification codes;

means for measuring differences between reception times of received messages; and means for causing received messages having the same sender identification code based on recognition results of the recognizing means whose differences between reception times are shorter than a predetermined time to be displayed on the display section en bloc, such that said received messages having the same sender identification code, whose differences between reception times are shorter than a predetermined time, are combined to form a single message that is displayed on said display section.

2. The radio calling receiver according to claim 1, further comprising:

means for managing the memory section using the sender identification codes as parameters when the messages having the sender identification codes are received and stored in the memory section; and means for selectively retrieving messages from the memory section based upon the sender identification codes when the messages are to be displayed on the display section.

3. The radio calling receiver according to claim 1, further comprising:

means for recognizing an en bloc display cancellation code included in a message; and means for causing the messages having the same sender identification code to be displayed on the display section such that divided parts of the messages having the same sender identification code are displayed separately, by using the en bloc display cancellation code.

4. The radio calling receiver according to claim 1, further comprising means for allowing switching between en bloc display and individual display by a user's manipulation of a switch.

* * * * *

UNITED STATES PATENT AND TRADEMARK OFFICE

CERTIFICATE OF CORRECTION

PATENT NO. : 6,603,390 B1 
DATED : August 5, 2003
INVENTOR(S) : Toshiyuki Tsumura et al.

Figure 13:
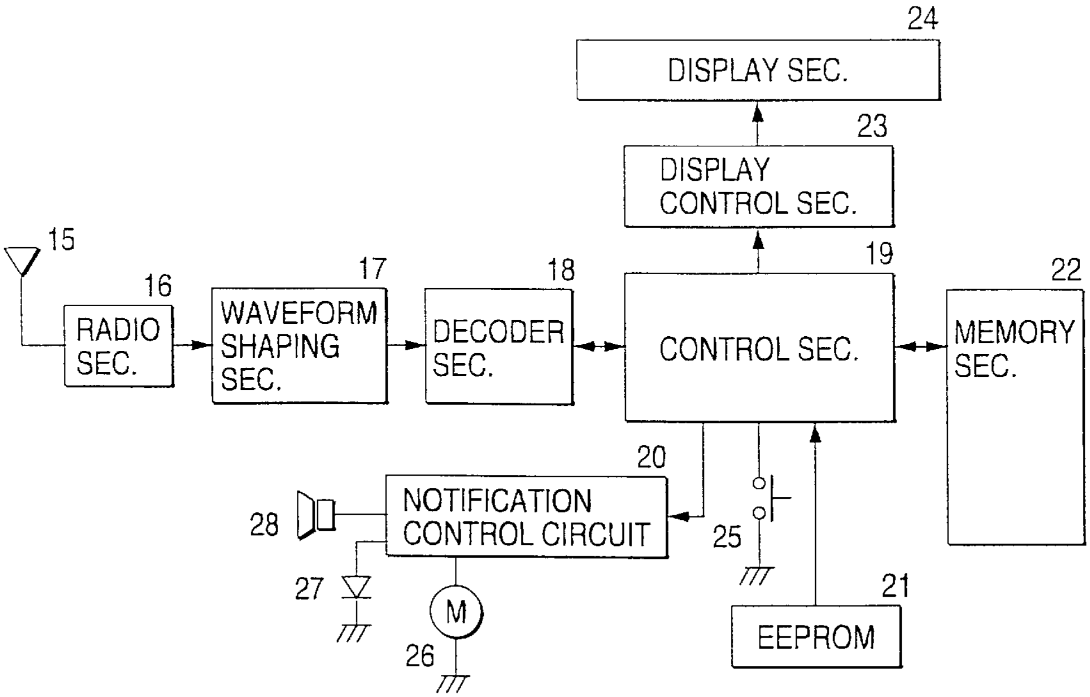
FIG. 13 is a block diagram showing the configuration of a conventional pager.
Figure 13:
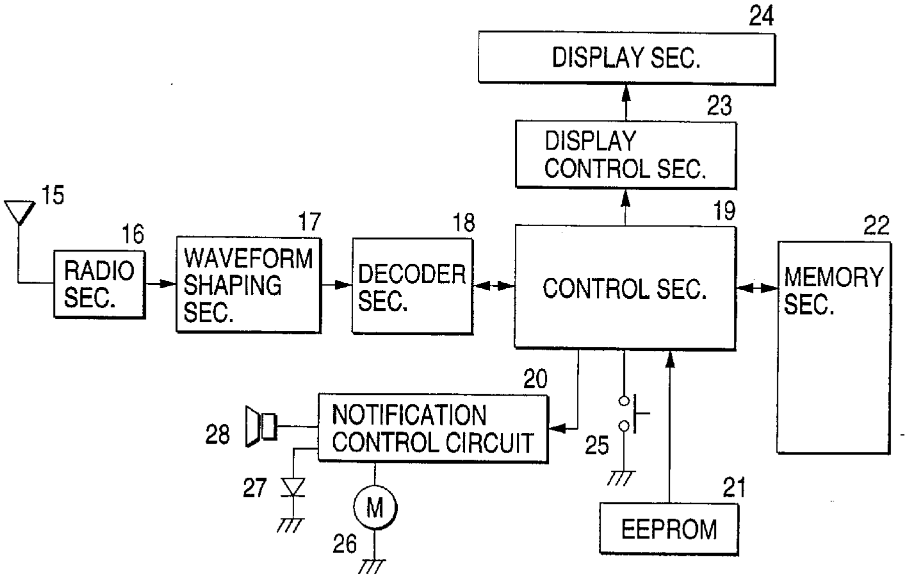
FIG. 13 PRIOR ART

It is certified that error appears in the above-identified patent and that said Letters Patent is hereby corrected as shown below:

The sheet of drawing consisting of figure 13, should be deleted to appear as per attached figure 13.

Column 1,
Line 37, please delete "section. 24", and insert therefore -- section 24 --.

Column 4,
Line 2, please delete "time,control", and insert therefore -- time control --.
Lines 62-63, please delete "the display section to display", and insert therefore -- the display section 10 to display --.

Column 5,
Line 15, please delete "コノメッセーシヲミタラ", and insert therefore

-- コノメッセージヲミタラ --.

Lines 25-31, please delete 31, and insert therefore lines,

-- 1st transmission: ]01 -- 2555744334693304O2

コノメッセージヲ

2nd transmission: ]01 -- 724191401037

ミタラTEL

3rd transmission: ]01 -- 2341043112

クダサイ

4th transmission: ]01 012-345-6789 --.

Line 35, please delete "コノメッセーシヲミタラ", and insert therefore -- コノメッセージヲミタラ --.

Line 41, please delete "examples-of", and insert therefore -- examples of --.

Line 57, please delete "コノメッセーシヲミタラ", and insert therefore

-- コノメッセージヲミタラ --.

UNITED STATES PATENT AND TRADEMARK OFFICE

CERTIFICATE OF CORRECTION

PATENT NO. : 6,603,390 B1
DATED : August 5, 2003
INVENTOR(S) : Toshiyuki Tsumura et al.

It is certified that error appears in the above-identified patent and that said Letters Patent is hereby corrected as shown below:

<u>Column 6,</u>
Line 36, please delete "sender Identification", and insert therefore -- sender identification --.

<u>Column 7,</u>
Lines 15-16, please delete "messages サキホドノケンTELアリガトウゴザイマシタ """, and insert therefore --messages " サキホドノケンTELアリガトウゴザイマシタ "--.

Line 20, please delete "コノメッセーシヲミタラ", and insert therefore -- コノメッセージヲミタラ --.

Line 25, please delete "4th transmission: ]01012-345-6789", and insert therefore
-- 4the transmission: ]01 012-345-6789 --

Line 65, please delete "コノメッセーシヲミタラ", and insert therefore -- コノメッセージヲミタラ --.

<u>Column 8,</u>
Line 3, please delete "4th transmission: ]01012-345-6789", and insert therefore
-- 4the transmission: ]01 012-345-6789 --.
Lines 8-9, please delete line 8 and 9, and insert therefore following 2 lines,
-- 7th transmission: ]01 2504310412713241]]

ゴザイマシタ--.

Line 43, please delete "z,1", and insert therefore -- --コノメッセージヲ--.

Line 51, please delete "サキホドノケン".

Line 52, please delete "The code "[4" at", and insert therefore -- The code "[4]" at --.

UNITED STATES PATENT AND TRADEMARK OFFICE

CERTIFICATE OF CORRECTION

PATENT NO. : 6,603,390 B1 
DATED : August 5, 2003
INVENTOR(S) : Toshiyuki Tsumura et al.

It is certified that error appears in the above-identified patent and that said Letters Patent is hereby corrected as shown below:

Column 9,
Line 10, please delete "ｺﾉﾒｯｾｰｼﾞｦﾐﾀﾗ", and insert therefore -- コノメッセージヲミタラ --.

Signed and Sealed this

Sixth Day of January, 2004

JAMES E. ROGAN
*Director of the United States Patent and Trademark Office*